United States Patent [19]

Sanner

[11] Patent Number: 4,876,701

[45] Date of Patent: Oct. 24, 1989

[54] SYNCHRONIZATION FAILURE DETECTION

[75] Inventor: Martin W. Sanner, San Jose, Calif.

[73] Assignee: Tandem Computers Incorporated, Cupertino, Calif.

[21] Appl. No.: 126,971

[22] Filed: Nov. 30, 1987

[51] Int. Cl.$^4$ .............................................. H04L 7/00
[52] U.S. Cl. .................................... 375/106; 375/108; 328/63
[58] Field of Search ................. 375/106, 118, 108, 10, 375/94; 371/1, 47; 328/63, 72

[56] References Cited

U.S. PATENT DOCUMENTS 3,959,587  5/1976  Allias .................................. 375/108

Primary Examiner—Robert L. Griffin
Assistant Examiner—Marianne Huseman
Attorney, Agent, or Firm—Townsend & Townsend

[57] ABSTRACT

A method, and apparatus implementing that method, for monitoring a synchronization circuit to ensure proper operation thereof. The synchronization circuit is of the type that receives asynchronously occurring input pulses to produce therefrom representations of the received input pulses, having state transitions synchronized to the state transitions of a periodic clock signal. The invention also receives the input pulses and the synchronized representation of those pulses, to ensure that for every input pulse there is provided a synchronized pulse by the synchronization circuit.

7 Claims, 1 Drawing Sheet

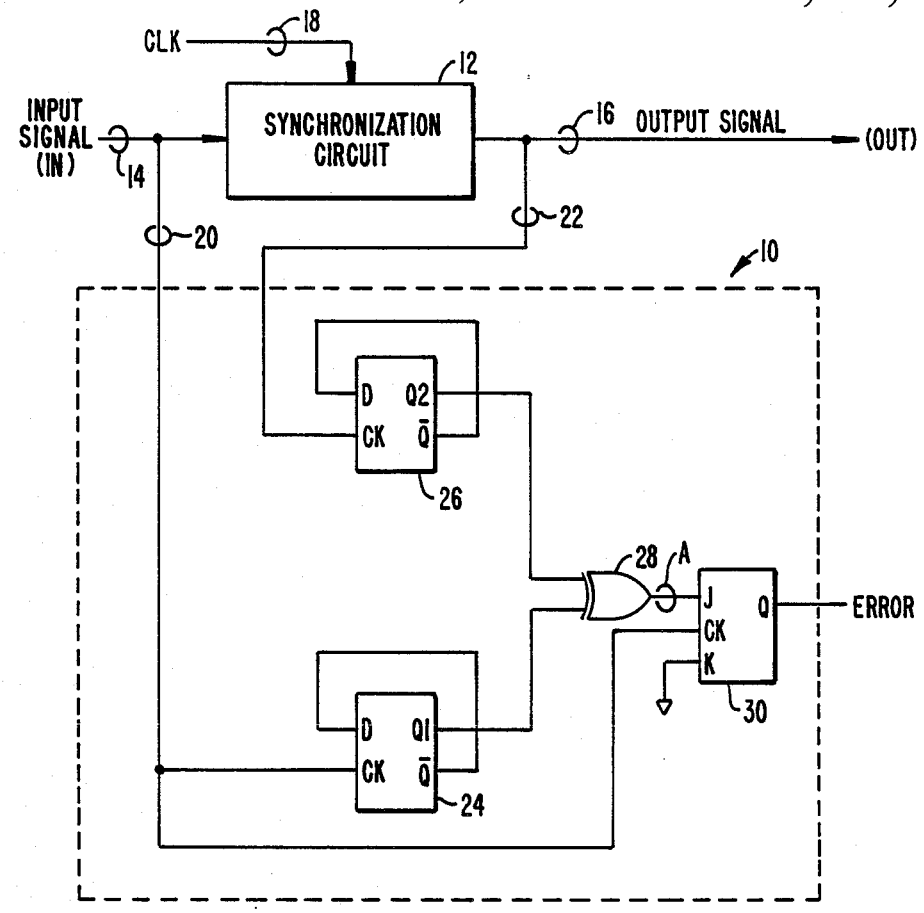
FIG._1.
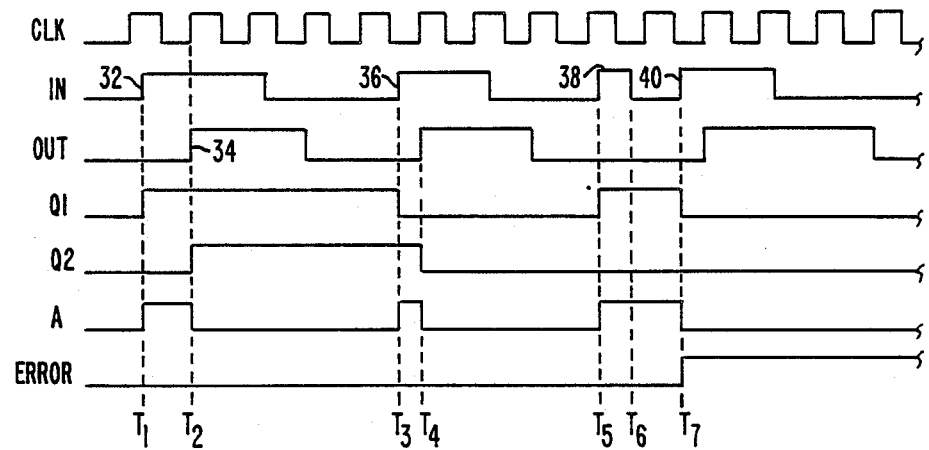
FIG._2.

SYNCHRONIZATION FAILURE DETECTION

BACKGROUND OF THE INVENTION

The present invention relates to generally to digital equipment, and more particularly to a method and apparatus for monitoring a synchronization circuit to ensure proper operation of the circuit.

In many digital systems, it is often necessary to receive asynchronously appearing pulses, and to synchronize those pulses with an internal clock (i.e., a periodic pulse train). An example of a synchronization circuit may be found in U.S. Pat. No. 4,700,346.

There are occasions, however, when a synchronization circuit will fail to respond to a received input pulse. For example, when the received input pulse is shorter than the sampling period of the synchronizer no synchronized representation will be produced. Also, when the pulse rate of the input signal is higher than the synchronization rate the synchronizer may fail to respond. Of course, the synchronizer itself may fail, causing it to ignore input events. These are all circumstances which could create problems if not detected.

SUMMARY OF THE INVENTION

Accordingly, the present invention provides a method, and apparatus for implementing that method, of monitoring the input to, and the output from, a synchronization circuit of the type described above to produce an error signal when two input pulses are received without an interstitial output pulse.

Broadly, the method of the present invention operates by noting each occurrence of an input pulse to the synchronization circuit and each representation produced therefrom; and comparing to ensure that for each input pulse occurrence a synchronized representation is produced; if not, an error signal is generated to denote a synchronizer malfunction.

One implementation of the method of the present invention comprises the steps of producing a count for each input pulse, and subtracting from that count each resultant output pulse of the synchronizer. If that count is greater than one (i.e., 2) the error signal is produced.

The method itself is implemented by an event counter in the form of a pair of flip-flops, each connected to note occurrence of the input signal to the synchronizer, and the resultant output pulse from the synchronizer. Noting the former without the latter upon receipt of a subsequent input pulse generates the error signal.

A number of advantages are achieved by the present invention. The invention is able to detect occurrence of an input pulse that the synchronization circuit fails to "see," producing an error signal indicative thereof.

Further, should the synchronization circuit fail, the invention is capable of detecting that failure.

These and other aspects and advantages of the present invention will become apparent to those skilled in the art upon a reading of the following detailed description of the invention, which should be taken in conjunction with the accompanying drawings.

BRIEF DESCRIPTION OF THE DRAWINGS

FIG. 1 is a block diagram of the invention used in conjunction with a synchronizer circuit; and FIG. 2 is a timing diagram to illustrate the operation of the invention.

DETAILED DESCRIPTION OF THE INVENTION

Referring now to the Figures, and in particular FIG. 1, there is shown a synchronization circuit 12 coupled to an event counter, designated generally with the reference numeral 10, and constructed in accordance with the teachings of the present invention. The synchronization circuit 12 operates to receive an input signal (IN) on a signal line 14, producing therefrom, and a clock (CLK) signal, an output signal (OUT) on line 16. The OUT signal is a synchronized representation of the IN signal, having transitions that are synchronized to transitions of the CLK signal that is coupled to the synchronization circuit 12 by signal line 18.

Used to monitor proper operation of the synchronization circuit 12, the event counter 10 receives the IN and OUT signals via signal lines 20 and 22 that couple them to the clock (CK) inputs of a pair of flip-flops 24, 26, respectively. As FIG. 1 indicates, the flip-flops 24, 26 are connected in the toggle configuration in that each has its negative or FALSE output ($\overline{Q}$) connected to its data (D) input. Further, the flip-flops 24, 26 are edge-triggered; that is, they are set to the state of the signal applied to their data (D) inputs at a state transition of the signal received at the CK input (in the present embodiment, a positive-going transition).

The positive or TRUE outputs (Q1, Q2) of the flip-flops 24 and 26 are coupled to the inputs of an EXCLUSIVE-OR gate 28, whose output produces a signal A that is coupled to the set (J) input of a J/K flip-flop 30. The reset (K) input of the flip-flop 30 is connected to a LOW or ground G, to configure the flip-flop 30 as a latch. The IN signal at the clock (CK) input of the flip-flop 30, and its true or positive output (Q) forms an ERROR signal, signifying improper operation of the synchronization circuit 12 when HIGH.

The flip-flop 30 is also an edge-triggered device. Positive-going state transitions at its CK input (i.e., in the IN signal) will cause the flip-flop to set its Q output to the level (HIGH or LOW) of the signal at its J input. Once set, it cannot be reset in the illustrated configuration (since the K or reset input is permanently LOW)—thus its latch capability.

Turning now to FIG. 2, operation of the circuit is as follows: The synchronization circuit 12 may be constructed to synchronize the leading edge of each positive pulse forming the IN signal to the rising or positive-going transitions of the CLK signal. Thus, as indicated in FIG. 2, at the time indicated as $T_1$, between two rising edges of the CLK signal, a leading edge of the IN signal is received. Assume, at time $T_1$, the flip-flops 24 and 26 are both in a reset state (i.e., the $\overline{Q}$ output of each is HIGH). The positive transition 32 of the IN signal will cause the flip-flop 24 to toggle, and the Q1 output to go HIGH. The IN signal is also received by the J/K flip-flop 30. However, when the state transition of the IN signal occurs (at time $T_1$), both outputs Q1 and Q2 are LOW, so that the signal applied to the set (J) input of the flip-flop 30, via the EXCLUSIVE-OR gate 28, is LOW. Thus, the flip-flop 30 remains in a reset condition.

Assume, at time $T_2$, synchronization is achieved, and the synchronization circuit 12 produces the OUT signal in the form of a synchronized representation of the IN signal, having a leading edge 34 synchronized with a rising state transition of the CLK signal, as FIG. 2 illustrates. The leading edge 34 of the OUT signal operates to toggle the flip-flop 26, causing its output Q2 to go HIGH. Note that the time period between $T_1$ and $T_2$ the signal A from the EXCLUSIVE-OR gate 28 was HIGH, but when the output Q2 went HIGH with the rising edge 34 of the OUT signal the signal A disappeared. Thus, upon receipt of the next IN signal pulse 36, which clocks the flip-flop 30, a ZERO or LOW is at the data (D) input of the flip-flop 30, and its Q output remains LOW.

However, at time $T_5$ a narrow pulse 38 is received by the synchronization circuit 12 that causes a problem: The pulse 38 of the input signal IS does not last long enough to allow the synchronization circuit 12 to establish the necessary synchronization. Thus, at time $T_5$ the flip-flop 24 is toggled to a ONE at its Q1 output. At time $T_6$, before a synchronized representation can be formed, the IN signal disappears. The output Q2 of flip-flop 26, however, remains LOW because the synchronization circuit 12 was unable to produce the OUT signal, due to the short time period of the pulse 38 of the input signal IN.

Thus, when the leading edge of the next pulse 40 of the IN signal occurs at time $T_7$, the signal A is HIGH and, therefore, flip-flop 30 is set to a ONE, generating the ERROR signal. The error remains latched by the flip-flop 30.

I claim:

1. In a digital system, having synchronizing means operable to receive an asynchronously occurring input pulse to generate therefrom an output signal in the form of a representation of the input pulse having at least one digital state change synchronized to a transition of a digital clock signal, apparatus for monitoring the operation of the synchronizing means to determine that for each received input pulse a corresponding representation is produced, the apparatus comprising:

first circuit means, coupled to receive the asynchronously occurring input pulse and to note occurrence of the asynchronously occurring input pulse, for generating a first signal indicative of the noted occurrence of the asynchronously occurring input pulse;

second circuit means, coupled to receive the output signal of the synchronizing means and to note the appearance of the representation of the input pulse, for generating a second signal indicative of the noted appearance of the representation; and third circuit means, coupled to receive the first and second signals and responsive to the occurrence of the asynchronously occurring input pulse, for producing therefrom an output error signal when the occurrence of the asynchronously occurring input signal is without a responsive occurrence of the output signal of the synchronizing means.

2. The apparatus of claim 1, wherein the first circuit means includes counting means for counting occurrences of the input signal.

3. The apparatus of claim 2, wherein the counting means includes a flip-flop connected in toggle configuration and coupled to the asynchronously occurring input pulse to receive the input signal as a clocking signal, the flip-flop being operable to produce an output signal indicative of occurrence of the input signal.

4. In digital apparatus of the type having synchronizing means operable to receive an asynchronously occurring input pulse to generate therefrom a representation of the input pulse, the representation having a transition from one digital state to another digital state such that the transition is synchronized to a transition of a periodic digital clock signal, a method of checking for an appearance of the representation for each occurrence of the input signal, the method comprising the steps of:

noting each occurrence of the input pulse; and producing an error signal when two successive occurrences of the input pulse are not separated by generation of the representation.

5. In a digital system having means for synchronizing an asynchronously occurring input pulse occurring at an input to the synchronizing means such that an output signal in the form of a representation of the input pulse having at least one digital state change synchronized to a transition of a digital clock signal appears at an output of the synchronizing means, an apparatus for monitoring the operation of the synchronizing means to determine that for each received input pulse, a corresponding representation is produced, the apparatus comprising:

a first means for noting an occurrence of the asynchronously occurring input pulse, the means for noting the occurence operatively coupled to the input of the synchronizing means such that a first signal indicative of the noted occurrence is generated when an occurence is noted;

a second means for noting the appearance of the representation of the input pulse, the means for noting the appearance of the representation operatively coupled to the output of the synchronizing means such that a second signal indicative of the noted appearance is generated when an appearance of the representation is noted; and means for receiving the first and second signals, the means for receiving the signals operatively coupled to the first and second means and responsive to the occurrence of the asynchronously occurring input pulse such that an error signal is output when the noted ocurrence of the asynchronously occurring input signal is without a responsive noted appearance of the output signal of the synchronizing means.

6. The apparatus of claim 5, wherein the first means includes means for counting occurrences of the input signal.

7. The apparatus of claim 6, wherein the means for counting includes a flip-flop connected in a toggle configuration and coupled to the asynchronously occurring input pulse to receive the input signal as a clocking signal, the flop-flop being operable to produce an output signal indicative of occurrence of the input signal.

* * * * *